United States Patent
Lee et al.

(10) Patent No.: US 7,488,401 B2
(45) Date of Patent: Feb. 10, 2009

(54) WET-LAID FRICTION MATERIAL, SYSTEM AND METHOD

(75) Inventors: James Martin Lee, Watertown, NY (US); Eric Arthur Schueler, Maineville, OH (US); Matthew Joseph Trippel, Centerville, OH (US)

(73) Assignee: Sulzer Friction Systems (US) Inc., Dayton, OH (US)

( * ) Notice: Subject to any disclaimer, the term of this patent is extended or adjusted under 35 U.S.C. 154(b) by 422 days.

(21) Appl. No.: 11/178,728

(22) Filed: Jul. 11, 2005

(65) Prior Publication Data

US 2007/0009730 A1    Jan. 11, 2007

(51) Int. Cl.
*D21F 11/00* (2006.01)

(52) U.S. Cl. .................. 162/141; 428/311.51; 442/417; 442/73; 442/101; 523/149

(58) Field of Classification Search ................. 162/141; 428/311.51; 523/149; 442/417, 73, 74, 101, 442/148; 427/203, 386
See application file for complete search history.

(56) References Cited

U.S. PATENT DOCUMENTS

| | | | |
|---|---|---|---|
| 3,829,180 A | 8/1974 | Gardner | |
| 4,256,801 A | 3/1981 | Chuluda | |
| 4,548,678 A | 10/1985 | Laflin et al. | |
| 4,639,392 A | 1/1987 | Nels et al. | |
| 4,828,728 A | 5/1989 | Dimigen et al. | |
| 5,615,758 A | 4/1997 | Nels | |
| 5,646,076 A | 7/1997 | Bortz | |
| 5,662,993 A | 9/1997 | Winckler | |
| 5,807,518 A | 9/1998 | Menard et al. | |
| 5,842,551 A | 12/1998 | Nels | |
| 5,998,311 A | 12/1999 | Nels | |
| 6,065,579 A | 5/2000 | Nels | |
| 6,170,990 B1 | 1/2001 | Hawkins | |
| 6,277,769 B1 | 8/2001 | Dowell et al. | |
| 6,439,363 B1 | 8/2002 | Nels | |
| 6,630,416 B1 | 10/2003 | Lam et al. | |
| 6,638,883 B2 | 10/2003 | Gaffney et al. | |
| 6,831,146 B2 | 12/2004 | Aiba et al. | |
| 6,835,448 B2 | 12/2004 | Menard et al. | |
| 2004/0006192 A1 | 1/2004 | Aiba et al. | |
| 2005/0075022 A1 | 4/2005 | Lam | |

FOREIGN PATENT DOCUMENTS

| | | |
|---|---|---|
| DE | 31 13004 A1 | 10/1982 |
| DE | G 91 01 069 U1 | 4/1991 |
| DE | 40 25 914 A1 | 2/1992 |
| DE | 199 26 248 A1 | 12/2000 |
| EP | 1 304 512 A1 | 4/2003 |
| JP | 01-211010 A | 8/1989 |
| JP | 02-190672 A | 7/1990 |
| JP | 04-078374 A | 3/1992 |
| JP | 06-229474 A | 8/1994 |
| WO | 2004/094876 A1 | 11/2004 |

*Primary Examiner*—Mark Halpern
(74) *Attorney, Agent, or Firm*—Jacox, Meckstroth & Jenkins

(57) ABSTRACT

This invention relates to a friction material and, more particularly, to a wet friction material capable of being manufactured using conventional paper-making processes. Long fibers are used to form a wet-laid homogeneous skeletal matrix, which is reinforced by dispersing particulate materials throughout the friction matrix and throughout the matrix binder, specifically at the interstices of adjacent fibers, to significantly increase the shear strength of the material while having a near negligible effect on fluid flow through the material.

31 Claims, 8 Drawing Sheets

WET-LAID FRICTION MATERIAL, SYSTEM AND METHOD

BACKGROUND OF THE INVENTION

This invention relates to a friction material, method and process for making the material. The material comprises of long fibers that form a skeletal matrix, which is reinforced by dispersing particulate materials, specifically at the interstices of the adjacent fibers to significantly increase shear strength of the material after saturation and a system and method for making the material.

BRIEF DESCRIPTION OF THE PRIOR ART

Friction materials in the form of engineered composites and coatings are used in energy transmission devices. These friction materials are manufactured using many different processes and consist of many different compositions which are capable of yielding materials that possess superior characteristics, especially in the areas of wear resistance, stable friction level, thermal stability, shear strength and porosity. Several types of materials that have been found to possess these superior characteristics are specialized woven carbon textiles and particle deposition composites.

Specialized woven textiles, such as those disclosed in Winckler, U.S. Pat. No. 5,662,993; Gaffney U.S. Pat. No. 6,638,883; and Dowell, U.S. Pat. No. 6,277,769, all disclose prior art systems, methods and materials. Some of these systems and methods and materials require expensive manufacturing techniques, such as post-carbonizing processes in specialized atmospheres, resulting in low productivity in manufacturing which makes them cost prohibitive. These materials have been found to typically provide desirable friction characteristics and desirable fluid permeability for many high-energy applications. However, the design of such materials has also been found to have low compressive loading limits which are attributed to both the brittleness of saturated carbon fibers and the void volume of the material structure. Under high compressive loading, the fracture toughness limit of the saturated woven fibers is easily exceeded, causing fiber fracture under high loads.

Particle deposition friction materials, such as those disclosed in Nels, U.S. Pat. No. 4,639,392; Lam, U.S. Pat. No. 6,630,416, which are incorporated herein by reference, require specialized processes to manufacture and can be many times the cost of manufacturing conventional materials that utilize the economic advantages of a paper-making process. These materials have been found to provide desirable friction characteristics and high unit loading capacity for many high-energy applications. However, the design of such materials has also been found to lack the necessary fluid permeability required of many high-energy applications.

Friction papers of the prior art are produced using paper-making equipment, which yield extremely low-cost materials with high productivity levels. However, these low-cost materials lack advantageous properties that are present in the above specialized woven textile grades and particle deposition materials, specifically strength, high levels of fluid permeability and favorable friction performance. FIG. 5A shows an electronic image of a prior art material. A product using the wet-laid, paper-making process that possesses high porosity, durability and wear resistance that parallels or exceeds that of carbon textiles and particle deposition materials would be very advantageous for high energy friction applications.

Non-woven fabrics, such as those disclosed in U.S. Pat. No. 5,646,076 to Bortz; U.S. Pat. No. 5,807,518 to Menard et al. and U.S. Pat. No. 6,835,448 to Menard et al. disclose friction materials and methods using long fibers and some techniques from the non-paper-making processes of the past, which illustrate the use of acrylontrile and binder mixtures that are applied to a material. These materials have been found to have low compressive limits attributed to the brittleness of fibers within the material structure. These materials have also been found to have unfavorable friction performance due to the absence of high carbon content fibers within the material structure. Fibers with high carbon content cannot be effectively formed into a material using such methods and processes due to the inherent brittleness of carbon fiber consisting of a carbon content greater that approximately 65%. It is desired to improve upon the teachings of the prior art.

SUMMARY OF THE INVENTION

In one aspect, this invention comprises a friction material comprising: a friction matrix comprising a plurality of wet-laid fibers that cooperate to define a skeletal matrix comprising a predetermined porosity, wherein the predetermined porosity is on the order of about 5 cubic feet per minute to 80 cubic feet per minute of air per square foot of material at a pressure drop of 0.5 inches of water.

In another aspect, this invention comprises a process for creating a skeletal matrix for use in a friction material, comprising the steps of: creating a mixture of a plurality of fibers with water; adding a particulate material to the mixture; and wet-laying the mixture onto a support such that the mixture cooperates to define a skeletal matrix comprising a predetermined porosity.

These and other objects and advantages of the invention will be apparent from the accompanying drawings and appended claims.

DETAILED DESCRIPTION OF THE PREFERRED EMBODIMENT

Figure 1:
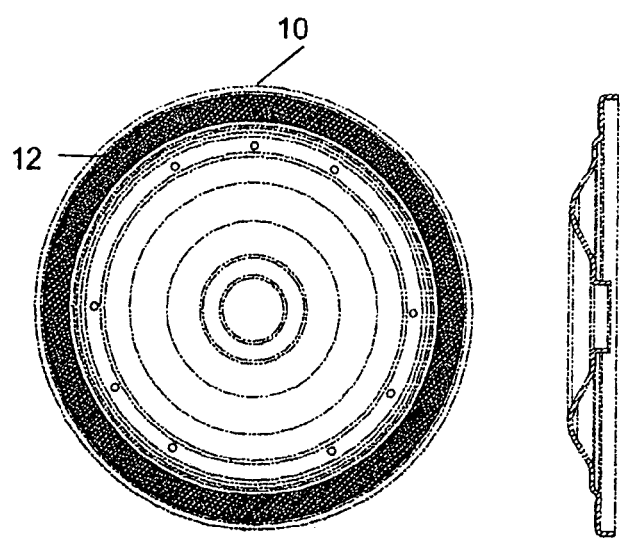
FIG. 1 is an illustration showing a friction material applied to a part such as a torque converter clutch piston in accordance with one embodiment of the invention.
Figure 2:
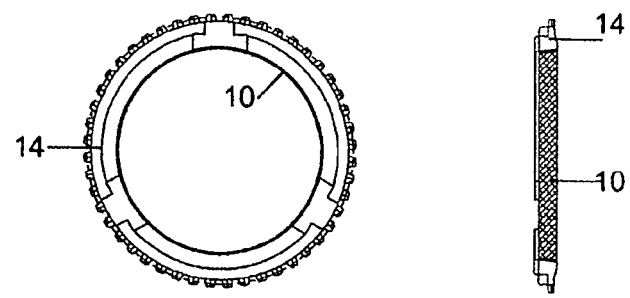
FIG. 2 illustrates the material on a synchronizer ring.
Figure 3:
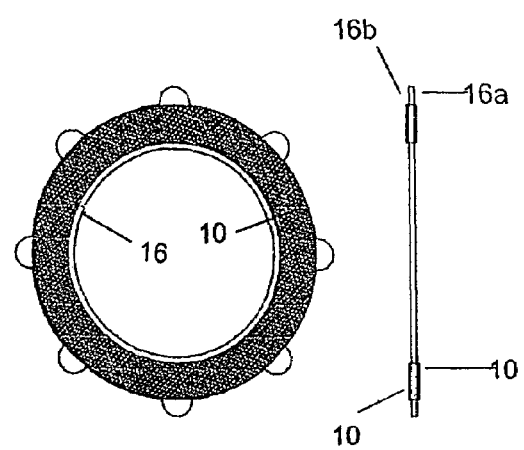
FIG. 3 illustrates another use of the material on a clutch plate or disc.
Figure 4:
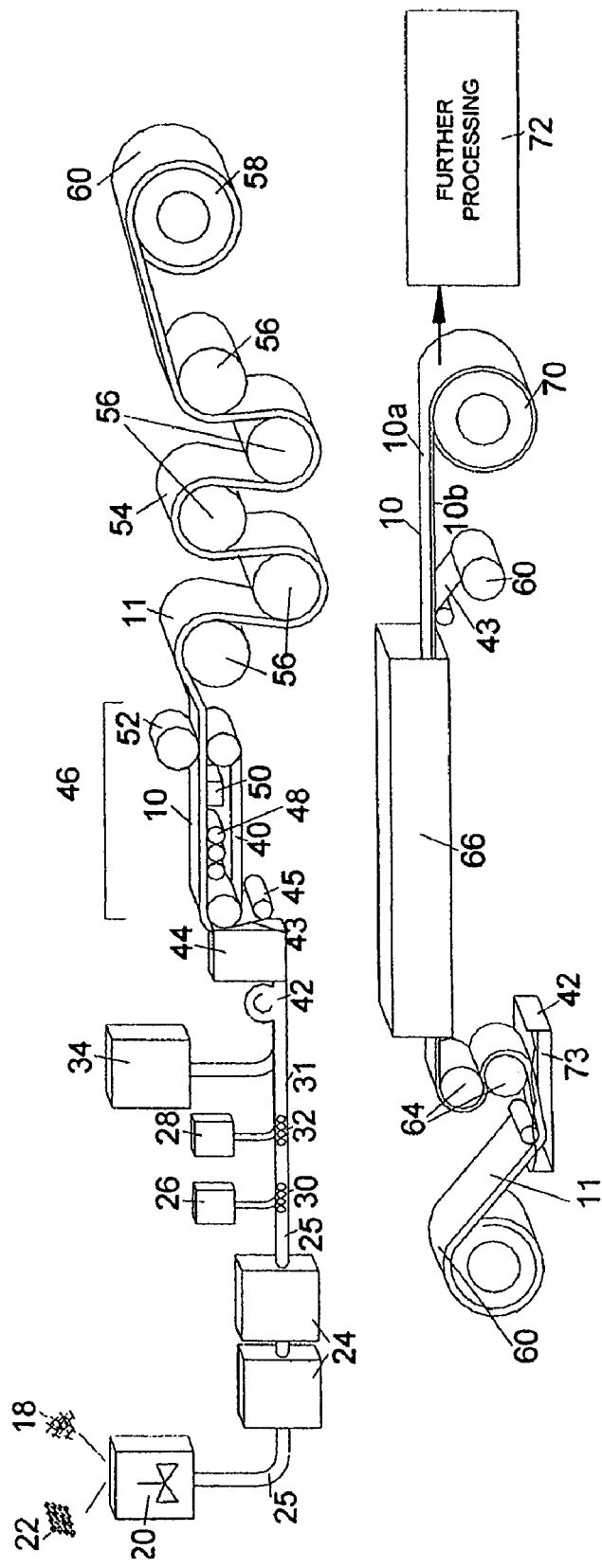
FIG. 4 is an illustration of a system and method for making the material.

Referring now to FIGS. 1-4 and 5B-8, a system, method and material 10, are shown. In the embodiment being described, the friction material 10 is a high porosity and high strength material that is bonded or adhered to a torque transmitting substrate, such as the substrates or plates 12, ring 14 and ring 16 mentioned earlier. The assembled part is then used to transmit energy from a rotational or sliding member to another member that is either in static or dynamic state as is conventionally known. Such systems may include, but are not limited to, transmission clutch plates, such as torque converter clutch plate 12 in FIG. 1, torque converter clutches, transmission bands, synchronizers, such as synchronizer ring 14 in FIG. 2, limited slip differentials, wet brakes, dry brakes or any applicable portion of a power-train or power transmission system. The process and method for making the friction material 10 will now be described relative to FIG. 4. The system, method and material 10 allow high levels of fluid flow in an end-use part or application, such as a locked-up torque converter clutch 12 (FIG. 1), clutch plate 16 (FIG. 3), synchronizer ring 14 (FIG. 2) or other power transmission environment or assembly. Thus, FIG. 1 illustrates the friction material 10 applied to a torque converter clutch 12. FIG. 2 illustrates the material 10 applied to a synchronizer ring 14, and FIG. 3 illustrates a clutch disc or plate 16 having the material 10 applied to a first side 16*a* and a second side 16*b* as shown. One or more of the plate parts 12, 14 and 16 may be used in a power transmission environment of the type conventionally known. Although not shown, the material 10 may be segmented to form a ring that is placed on the part, as taught by U.S. Pat. Nos. 5,615,758 and 5,842,551 to Nels, which is incorporated herein by reference and made a part hereof.

A plurality of fibers 18 are added to a mixing tank 20 that contains water. The ratio of water to fiber (by weight) is typically 90-98 percent water to 2-10 percent fiber. In the embodiment being described, it has been found that fiber geometries less than 2 millimeters in length are discouraged because it may adversely effect material porosity by allowing intimate fiber contact, thereby resulting in reduced porosity. It has also been found that the substantial and specific use of fibers 18 having a length greater than 2 millimeters can be comprised of a variety of high temperature, high tenacity or specific performance materials of various lengths and diameters. In one embodiment, the use of these high performance fibers 18 is restricted to fibers of less than 50 µm in diameter, more commonly, less than 15 µm in diameter. Nonetheless, it is desirable to maintain an aspect ratio for the majority of the fibers 18 of between about 15 µm in diameter and 50 µm in diameter to a length of between 2.25 millimeters and 12 millimeters. It is also found desirable to construct the composite formula to reserve 5-95 percent of the total composition by weight of the unsaturated, dried paper-fiber material 10 for long fibers. Preferably, these long fibers should be "high temperature" fibers with a thermal stability measured by thermogravimetric analysis ("TGA") with less than 5 percent weight loss in an atmosphere of air at a temperature of about 451 degrees Fahrenheit (232 degrees Celsius). In the illustration being described, the fibers 18 are wet-laid fibers and have a typical length of at least 0.08 mm and in one embodiment, between 2.5-3.5 mm. The fibers 18 may be non-cellulose fibers.

The water and fibers 18 are mixed by agitating in the tank 20 by mechanical stirring until a homogenous suspension is created at room temperature. In this regard, the fibers 18 are typically added first to the tank 20 because of the time required to disperse or refine fibers 18. The resulting slurry is somewhat thickened, reducing the propensity of particulate materials 22, which are subsequently added as described later herein, to settle out when added.

Next, the particulate materials 22 are then added into the fibrous slurry at the tank 20 and agitated by mechanical mixing. The agitating method can be potentially used to disperse raw materials as well as to refine raw materials dimensionally by fibrillating or similar means. In the illustration, the particulate materials 22 comprises a carbonaceous material; a nitride material; a metallic oxide material; a silicacious material; a powdered or granulated elastomeric material; a carbide material; a polymeric material; a mineral, metallurgical coke, petroleum coke, activated carbon or graphite carbon. The plurality of particle materials 22 may comprise finely chopped or milled fibers comprising a length of less than about 400 microns. Also, the plurality of particle materials may comprise a minor dimension as small as about 150 nm and a major dimension of about 300 microns.

The mixture of fibers 14 and particles 22 is agitated and refined (dimensionally changing) until the tank 20 contains a homogeneous mixture of the fibers 18 and particulate material 22 that are held in suspension.

From the tank 20, the homogeneous mixture is pumped and transported to subsequent stages through a conduit 25 and processed similar to a traditional paper making process, but without detrimental effects of materials 18, 22 settling or separating. Settling or separation is reduced or prevented by entangling and refining the fiber material 18. In one embodiment being described, the homogeneous mixture typically consists of 0.5-7 percent solids content of the slurry by weight.

The homogeneous mixture is typically pumped through conduit 25 to two or more storage tanks 24 using pumps (not shown). As the pumping continues, the mixture from the storage tanks 24 is pumped through conduit 25. Additional chemicals 26 and 28 are added and mixed into the slurry using static mixers 30 and 32. In one embodiment, the chemicals 26 and 28 may include ionically charged polymers, such as cationic and/or ionic/and/or non-ionic retention aids such as Drew-Flocc 2249 from Ashland Chemical or Nalco 7530 from Nalco Chemicals, strength enhancement resins, such as Amres HS30 or Cascomel wet strength, and/or Ph buffers, which are known to those skilled in the art. In the illustration being described, an ionically charged polymer, such as Drew-Flock 2249, is typically added at levels between 1.5 and 150 parts per million ("PPM") based on total dynamic slurry weight. The levels are adjusted for inherent raw material charge, material geometry and water quality. U.S. Pat. No. 5,700,353 to Vincent and U.S. Pat. No. 4,925,530 to Sinclair illustrate some of the chemicals and additives that may be introduced and which are known to those skilled in the art. These U.S. Pat. Nos. 5,700,353 and 4,925,530 are incorporated herein by reference and made a part hereof.

As the homogeneous mixture travels downstream in conduit 25, dilution water may be added from a tank 34 into the homogeneous mixture. This lowers the percentage of solids by weight of the homogeneous mixture to between 0.015 percent to 4.0 percent, thus reducing process variation, improving paper formation and carrying final paper making chemicals to the forming area. These dilution levels of the slurry are required to create a consistent formation containing high levels (5-95 percent) of long fibers 18. Because of the use of the long fibers 18 in the embodiment being described, a larger volume of water is required to carry individual fibers through the system so that they can be randomly and evenly deposited on a carrier web 40 as in permitting water draining through the carrier web 40 without forming fissures or undesirable variations in thickness and formation.

The homogeneous mixture or slurry is pumped by a pump 42 to a head box 44 as it enters a paper making station or machine 46. The head box 44 is either an open or closed vessel that controls the dispersion of the slurry mixture onto a carrier web or belt 40. It should be appreciated that the elimination of most short fibers from the homogeneous mixture in the illustration being described may result in difficulties in carrying the material 10 down through the paper making station or machine because of the reduction of intimate contact between the short fibers. This results in low wet strength of material 10 throughout the paper making process. To overcome this obstacle, a supportive carrier or sheet 43 from a supply 45 can be used to carry the continuously-created web of material 10 through the paper making station. In this regard, the carrier sheet 43 may be a substrate, scrim, woven cloth, non-woven web, mesh, screen or other conventional conveyor such as a belt, whether solid or other foraminous construction. The carrier sheet 43 can be removed or left in place during or after a subsequent saturation step and even bonding. Note that the carrier sheet 43 is separate from the web or conveyor belt 40, yet is supported by the belt 40.

The head box 44 comprises an adjustable slot or slice opening (not shown) known to those in the paper making arts by dilution water flowing over a submerged weir or dam. The point of entry of the slurry into the head box 44 is typically where most flocculation of the particles 22 and fibers 18 occurs and a high level (such as 93-99.5 percent water and 2-10 percent fiber 18 and/or particles 22) of slurry dilution is critical to the formation of the friction material 10.

The aqueous or homogeneous slurry flows from the head box 44 onto the continuously moving web 40 and support 43. In the embodiment being described, the conveyor belt or web 40 is fabricated as a fine-meshed screen. A substantial portion of the water is removed on this web 40 through surface tension dewatering using rollers 48, one or more vacuum boxes 50 or even pinch rollers 52.

This semi-dewatered material 10 on web 43 may be further pressed or embossed prior to traveling through a drying section that removes substantial amounts of remaining water. Thus, it should be understood that the aqueous homogeneous mixture is transformed from the slurry to a damp web as it is continually dried until a continuous paper-like product or material 10 or web 54 is formed. In the embodiment being described, the web 54 is passed through a plurality of heated rollers, such as rollers 56, perforated vacuum rollers, tunnel ovens, desiccating plates or other conventional methods to remove the water by heat or vacuum. The web 54 is then wound onto mandrels 58 to provide a supply 60 of dried friction material 10 which may be subsequently processed. For example, although not shown, the web 54 may at this stage in the process be cut into sheets for further processing.

Figure 5A:
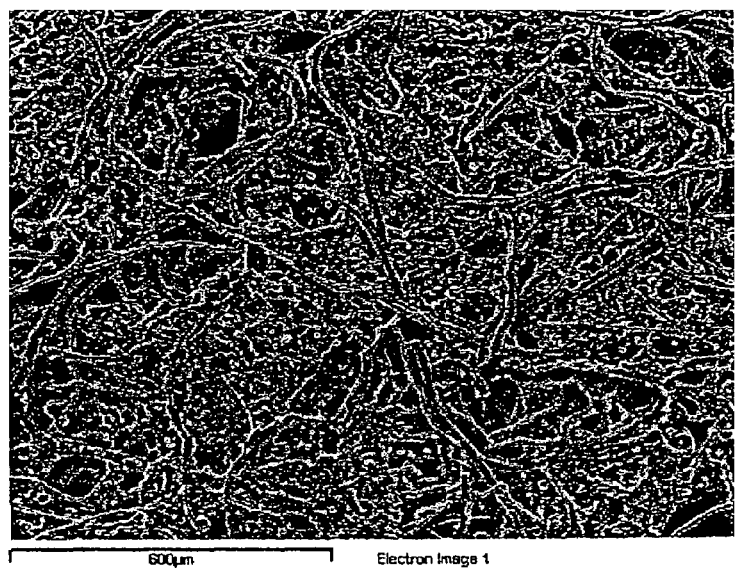
FIG. 5A is an electronic image of a prior art paper material.
Figure 5B:
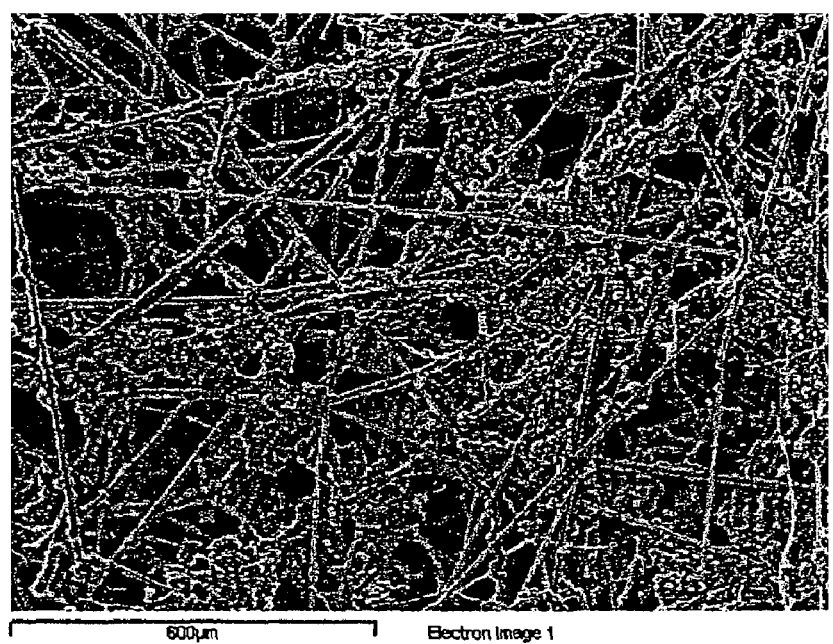
FIG. 5B is an image of the material 10 according to the illustration being described.

At this point in the process, the system and method of the embodiment being illustrated provides the continuous web 11 of material 10 having a homogeneous skeletal matrix that consists of high performance fibers 18 reinforced at the interstitial sites by particulate material 22 of adjacent fibers 18 in the manner described and shown later herein. FIG. 5A is an electronic image of a prior art paper material, and FIG. 5B is an image of the material 10 according to the illustration being described. This significantly increases the shear strength of the material 10 after being saturated while having a near negligible effect on fluid flow through the material 10. This arrangement of fibers 18 and particulate materials 22 results in a compliant, high strength, wear resistant, highly porous material 10 that is free from shudder.

To further strengthen the friction material 10, the web 11 of material 10 is caused submerged and passed through a vat or pan 42 and impregnated with a binder 73. In the illustration described, the binder 73 may be a thermoset resin, a modified thermoset resin, a thermoplastic resin, a powder resin or a blend of resins. The particle materials 22 may be introduced into the slurry directly or via the binder 73 (that is, provided in the binder). The particulate materials may comprise a carbonaceous material; a nitride material, a metallic oxide material, a silicacious material, a powdered or granulated elastomeric material, a carbide material, a polymeric material, a mineral, a metallurgical coke, petroleum coke, activated carbon or graphite carbon. The material may comprise finely chopped or milled fibers comprising a length of less than about 400 microns. The supply 60 is then passed through a pair of pinch rollers 64 to remove excess binder 73 from the web 11 and provide control of final binding content by weight. The saturated web 11 is significantly, but not completely, cured as it is "B-staged" as is known to those skilled in the art, using ovens 66 of the type that is conventionally known. It should be understood that heated rollers (not shown) or other suitable equipment may be used for performing the drying operation. After saturation and "B-staged" curing, the optional carrier sheet (not shown) may or may not be removed.

At block 72, the collected supply roll 70 may be further processed, such as by cutting the web 11 into shapes, rings or segments, embossing, machining or other operations, such as adhering the material 10 to a part. The material 10 may further be processed and applied to the friction environment and parts, such as those described earlier herein relative to FIGS. 1-3.

As best shown in FIG. 5B, note that the friction material 10 produced as a result of this process provides the material 10 comprising extremely long, rigid fiber geometry which shows a large amount of porosity through the material compared to materials of the prior art. FIG. 5B illustrates an electronic image illustrating the long fibers 18 and the particulate material 22 agglomerations which are located at the interstices between adjacent fibers 18. The particulate materials 22 are able to travel freely through the fiber matrix during formation because of the open porous structure of the material. This further allows the particulate material 22 to locate at the charged interstices of the fiber 18, resulting in improved material strength with a minimal reduction in material porosity. In this regard, the interstices comprise a relatively larger electrical charge density than the other areas along a length of any given fiber 18, which tends to attract the particulate material to the interstices through conventionally known concepts of flocculation.

The material provides a skeletal matrix having a predetermined porosity. In one embodiment, the predetermined porosity is on the order of about 5 cubic feet per minute to 80 cubic feet per minute of air per square foot of material at a pressure drop of 0.5 inches of water. In another application, the material comprises an outer diameter of greater than or equal to 282.5 mm and an inner diameter of less than or equal to 254 mm and said wet-laid friction material is bonded to a carrier having a thickness of at least 0.6 mm when tested under a pressure of a least 400 kPa in a fluid with kinematic viscosity of about 9.32 cSt, without the addition of grooves or texture, the flow rate across the wet-laid friction material ranges between about 0.4 l/min and 4.0 l/min.

Referring back to FIG. 4, notice that the web 11 of material 10 and the resultant friction material 10 comprise a top surface 10a and bottom surface 10b each of which may be used as a functional friction facing. The caliper or thickness of the finished friction material can range between 0.030 millimeters to 4.2 millimeters, but most preferably ranges between 0.5 millimeters and 1.5 mm. The weight of the finished friction material may range between 45 pounds/3000 ft$^2$ to 600 pounds/3000 ft$^2$ but most preferably ranges between 80 pounds/3000 ft$^2$ and 475 pounds/3000 ft$^2$, The shear strength of the finished friction material 10 densified at about 25 percent can range between 1.3 MPa and 13.7 MPa, but most preferably between 2.0 MPa and 8.2 MPa. The typical porosity of the finished material, can range between 5 cfm and 80 cfm of air per square foot at 0.5 inches of pressure drop of material but most preferably between 10 cfm and 60 cfm of air per square foot at 0.5 inches of pressure drop. In one illustration where the material is applied as shown in FIG. 1, the fluid permeability of the finished friction material 10, without secondary grooving or surface texturing processes, as measured when bonded to a torque converter piston with an OD of 300 mm, an ID of 41.8 mm with friction material outer diameter of at least 282.5 millimeter and an inner diameter of at most 254 millimeter, densified to 35 percent from the material thickness after saturation, measured when the piston is applied to a front cover at a zero differential speed at hydraulic apply pressure of about 400 kpa, simulating torque converter full-lock conditions, in a fluid possessing a kinematic viscosity of 9.32 cSt at a temperature of 90° C. at can range between 0.1 L/MIN and 4 L/MIN.

In another illustrative embodiment, water was added to the mixture 98 percent by weight of slurry at 34 at room temperature. The Ph of the water was adjusted by the addition of sodium hydroxide or sulfuric acid to a level between Ph 6.0 and 8.0. Next, 10.8 percent by weight of the SDC material composite of 0.125 inch long chopped PAN carbon fiber material composite and 2 percent of acrylic pulp by weight of the SDC material composite are added into the mix tank and the tank is agitated until there are no visible pills or bundles of acrylic pulp fibers.

Next, 8.4 percent by weight of the SDC material composite of milled 350-micro PAN carbon fiber and 16.4 percent of 8 μm by 26 μm acicular needle coke by weight were added along with 12 percent of 7 μm petroleum coke by weight of the SDC material composite to the mix tank 20. This mixture was then agitated until there were no visible agglomerations of coke or milled fiber. The Ph of the mixture was measured and adjusted if needed to a Ph range of between 6.0 and 8.0 by further addition of sodium hydroxide or aluminum sulfate at 20 in FIG. 4. Next, acrylontrile was prediluted to below 21 percent total solid suspension and 6 percent acrylontrile by weight of the SDC material composite added to the mixture. SDC material is the product 60.

The diluted stock was sequentially transferred through the storage tanks as described earlier herein relative to FIG. 4. As the stock is transferred through the conduit 25 toward the head box 44, a 2 percent concentration of diluted aluminum sulfate is injected into the pipe prior to a static mixing unit 30, 32 (FIG. 4) until a Ph of between 5.0 and 6.0 is obtained. The stock was pumped at a sufficient volumetric rate to form a well-structured paper-like material at the forming conveyor belt or web 40 moving at a speed of about 20 ft. per minute. Subsequent to this, a 78 ppm total background concentration of retention polymer Drew-Flocc 2449 from a 0.2 percent solution was added at an injection point 26.

The mixture passes through additional static mixing unit 32 and receives dilution water from supply 34 to bring the total solids to about 1 percent for the entire slurry mixture. This diluted slurry mixture is pumped to the head box 44 of a Fourdinier 44-52 paper machine. The aqueous slurry or mixture was then transferred to the optional carrying sheet 43 mentioned earlier. The aqueous slurry was mated to the forming fabric speed, which in the illustration is about 20 feet per minute. The slurry was dewatered using the surface tension or pinch rollers 52, vacuum box 50 and the slurry is dewatered using rolls 52. The wet web 11 was carried to steam heated dryer cans where the cans 56 remove between 98.5 to 99.5 percent of the wet paper water and was wrapped through the dryer cans sufficiently to control the drying and shrinkage rate of the web 11, so as to not fracture the web 11 during the drying process. The dried web or sheet 11 is wound onto and over the supply mandrel or roll 58 to provide the supply 60.

The supply 60 was then unwrapped and impregnated with a thermosetting phenolic resin binder. The web 11 was submerged in the vat or pan 62 of phenolic resin, which is diluted with isopropyl alcohol to control the viscosity, solids content and penetration of the resin resulting in a final resin content of about 30 percent by weight when the friction material was saturated and completely cured. The web 11, now saturated, exits the resin pan 42 and is squeezed or pinched between pinch rolls 64. The wet saturated web or paper is carried on a series of rollers (not shown) through the forced air drying oven 66 which dries the web 11 to a volatile level of 2.5 percent volatiles so that about 97.5 percent of the material 10 is cured. The material 10 exited the oven 66 without removing the carrier sheet 43. The material 10 was then sheeted for bonding onto one or more parts which are used in a friction environment, such as those parts or components illustrated in FIGS. 1-3.

Figure 6:
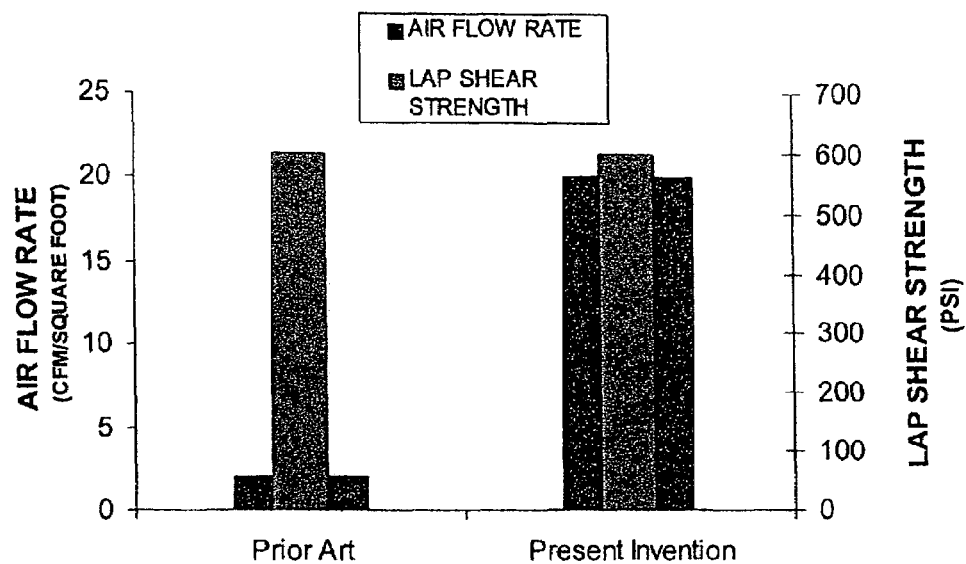
FIG. 6 is a bar graph illustrating porosity versus lap shears.

FIG. 6 compares the porosity vs. lap shear of the material 10 in the illustration to that of a conventional paper construction friction material 10. Notice the significantly improved porosity, which correlates to an increased fluid flow in the applications. Note also the lap shear strength of the friction material 10 is similar to that of paper materials of the prior art, yet has the advantages of increased porosity associated with woven materials of the prior art. This increased porosity results in an improved ability to dissipate hydrodynamic films of oil between interfacing friction components, thereby resulting in more favorable friction characteristics and shudder-free performance. This increased flow facilitates reducing or virtually eliminating the need for grooving the friction material, resulting in a higher energy capacity per friction facing compared to grooved applications. This increased fluid flow effectively dissipates heat from the interfacing surface of the friction material 10 and any mating component.

Advantageously, the system and method of the present invention utilizes techniques adopted from the traditional paper-making process in producing a substantially long fiber skeletal matrix reinforced with a particulate material 22 dispersed throughout and then subsequently saturated with resin. In the illustration being described, a basis weight of the material 10 ranges between 45 lbs/3000 ft$^2$ and 600 lbs/3000 ft$^2$, but preferably ranges between 80 lbs/3000 ft$^2$ and 475 lbs/3000 ft$^2$. The friction material 10 has a caliper ranging between 0.3 millimeters and 3.2 millimeters, but most preferably 0.5 millimeters and 1.5 millimeters. Fiber lengths range from about 0.08 millimeters to 12 millimeters, but most preferably between 0.5 millimeters and 3.5 millimeters.

In another embodiment, the fiber lengths may range between 2 millimeters and 12 millimeters, but most preferably between 2 millimeters and 6 millimeters. The long fiber content may range between about 5 percent to 95 percent weight of the saturated dried material 10, but most preferably ranges between 20 percent and 60 percent weight of the material 10.

Moreover, the long fibers 18 may be cellulose fibers or non-cellulose fibers, such as carbon fibers or may even contain a blend of cellulose and non-cellulose fibers. Also, short fibers may be mixed with the long fibers, but it is preferable that the short fiber length range between 0.08 millimeters and 2 millimeters or, most preferably, between 0.2 millimeters and 1 millimeter. In addition, the short fiber content in the mixture should range about 5 percent and 95 percent weight of the dried saturated material 10, but most preferably ranges between about 5 percent and 10 percent weight of the dried saturated material 10. As with the long fibers, the short fibers may be cellulose or non-cellulose fibers or a blend of cellulose and non-cellulose fibers.

Relative to the particulate material 22, the particulate material 22 may comprise a minor dimension as small as about 150 nm to a major dimension as large as about 300 μm, most preferably between about a minor dimension of 1 micrometer and a major diameter of 150 micrometers. The particulate material 22 may comprise carbonaceous materials such as metallurgical coke, petroleum coke, carbonized PAN or pitch, graphite, activated carbon, industrial diamond or other materials such as metallic oxide materials such as iron oxide, aluminum oxide, chromium ferrous oxide; silicacious materials such as boral silicate, quartz, diatomaceous earth; granulated elastomerics materials such as nitrile particle, nitrile butadiene particles and acrylic particles; cashew born polymer particles. Also, the particulate material 20 may be symmetrical in shape, asymmetrical and may comprise a carbide such as silicon carbide; polymeric particles such as cashew particles, modacrylic, phenolic, epoxy; or minerals such as calcium carbonate, calcium metasilicate, flint, and basalt.

In the illustration being described the particulate material content ranges from about 1 percent to about 85 percent weight of the saturated dried material, most preferably between about 5 percent and 50 percent weight of the saturated dried material. The particulate materials may also comprise finely chopped fibers, which may be fibers so small they are considered particles.

Regarding the binder or resin, the material 10 may contain a binder having a content ranging from about 1 percent to 60 percent weight of the saturated dried material 10, but most preferably ranges between about 25 percent and 50 percent of the weight of the saturated dried material. In the illustration being described, the binder may be a thermoset resin such as Ashland Aerofene 295-E-50, modified thermoset resin such as Schenectady Chemical SP 6493C, thermoplastic resin such as Dow P84, novalac phenolic resin such as Schenectady SP6300A, silicone resin such as Dow Corning 1107, cashew-based resin such as Cardolite 334, epoxy resin such as Shell-Epon 1001B, polyamide such as Skybond 701, melamine resin such as Borden Cascomel MF-2LM, nitrile butadiene resin such as Noveon 1562117, acrylic binder such as HB Fuller PN3178F. In the illustration being described, the binder may be in the form of fibers made of resin that are novaloid phenolic such as American Kynol 10BT, melamine fibers such as BASF Basofil slot fiber, or powdered phenolics such as Plenco 12114, or a polyimide fiber such as Lenzing fiber. In the illustration being described, the binder may be comprised of 2 or more of the aforementioned resins and/or a plurality of the fibers mentioned.

As taught by the aforementioned illustrations, the material 10 may have a shear strength between 680 kPa and 13.7 MPa, but, most preferably, ranges between about 1.3 MPa and 8.2 MPa when bonded at sufficient time temperature to substantially cure the material and pressure to cure the binder at 25 percent compression. The percentage of binding compression is determined by the following Formula:

$$\frac{\text{(Initial Thickness} - \text{Final Thickness)}}{\text{(Initial Thickness)}}$$

In the embodiment being described, the material 10 may contain a void volume ranging between about 1 percent to 75 percent, but most preferably ranges between about 30 percent and 60 percent of the total volume of open space within material.

In the illustration shown in FIG. 1, for example, the material 10 has an outer diameter of 282.5 millimeters and an inner diameter of 254 millimeters and bonded to a piston with an OD of 300 mm and ID of 41.8 mm to a thickness of 0.6 millimeter. The total fluid flow across the material 10 ranges between 0.1 L/MIN and 4 L/MIN when densified to 25 percent from the material thickness after saturation, fluid flow measured when the piston is applied to a front cover at a zero differential speed at hydraulic apply pressure of about 400 kpa, simulating torque converter full-lock conditions, in a fluid possessing a kinematic viscosity of 9.32 cSt at a temperature of 90° C.

The system and method provide a friction material 10 that may be used in a friction facing environment, such as on a synchronizer ring 14 (FIG. 2), a clutch disc 16 (FIG. 3) or a torque converter piston 10 (FIG. 1). However, it is also contemplated by the inventors that the material 10 may be applied to other environments as well.

Figure 7:
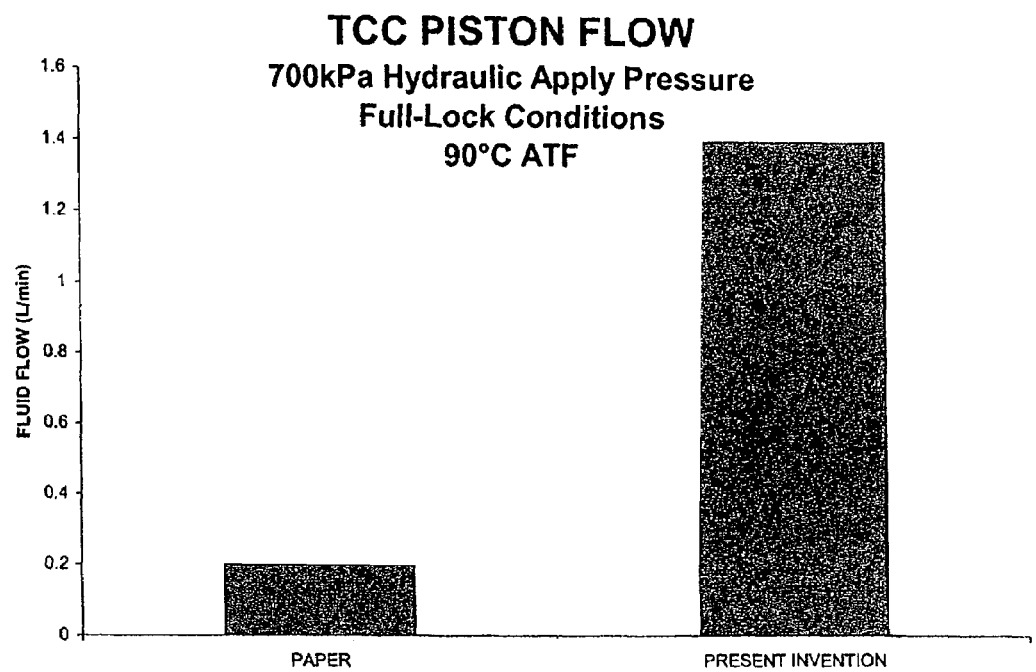
FIG. 7 is another bar chart illustrating a piston flow of the material applied to the torque converter clutch compared to the prior art paper material.

FIG. 7 shows data comparing an illustrative embodiment for piston flow for the torque converter clutch 12 shown in FIG. 1. The piston flow is compared to a prior art paper friction material, namely Select Powertrain Technologies CF-4500 manufactured and available from the assignee of the present application. Note the significantly improved piston flow rate which facilitates dissipating hydrodynamic films and results in lower inner face temperatures which in turn extends the useful life of the fluid in which the material 10 is used.

Figure 8:
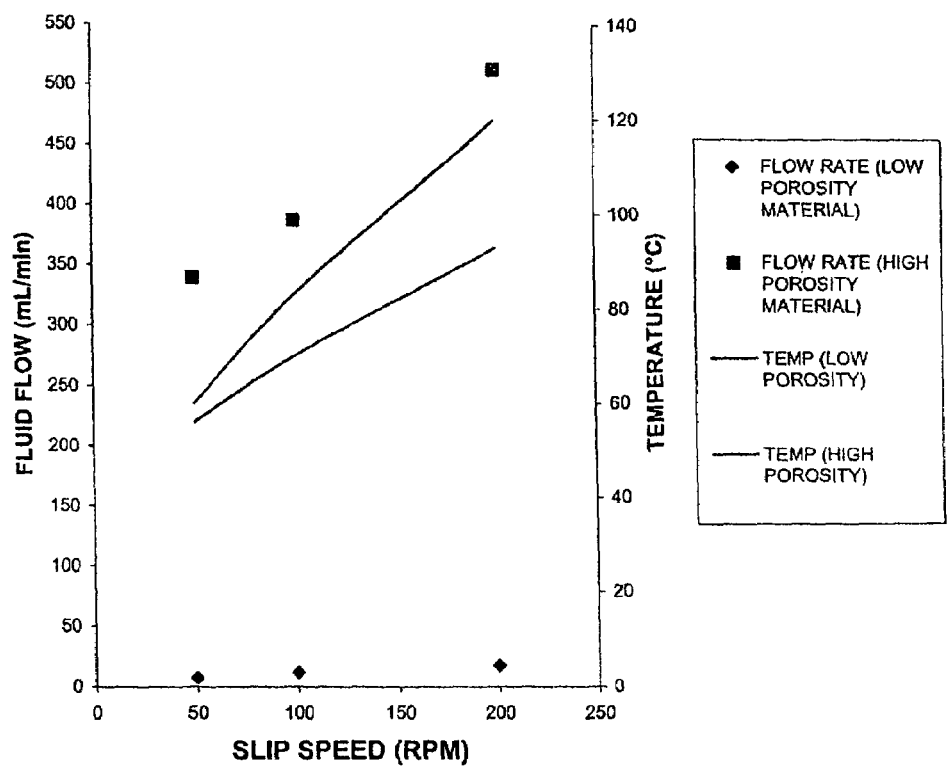
FIG. 8 illustrates the effect of a highly permeable material on the interface temperature of the friction material compared to a low permeability material on a torque converter clutch, such as the torque converter clutch illustrated in FIG. 1

FIG. 8 illustrates fluid flow versus temperature characteristics for a high permeability material compared to the prior art paper friction material, namely AFM Grade 4211. Note the affect of the high fluid flow rate through a high permeability material design compared to the effect of the low fluid flow rate through a low porosity material. The interface and temperature of the high porosity material is significantly lower than that of the low porosity or paper material.

While the material, parts and method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A friction material having a first surface and a second surface comprising:
    a friction matrix comprising a plurality of wet-laid fibers that cooperate to define a skeletal matrix comprising a predetermined porosity, said plurality of wet-laid fibers cooperating to define a plurality of interstices in said skeletal matrix, wherein a majority of said plurality of wet-laid fibers comprise a length of at least 0.08 mm;
    a binder;
    a plurality of particles; and
    a plurality of agglomerations comprising said binder and said plurality of particles, said plurality of agglomerations being formed or provided at said plurality of said plurality of interstices, respectively, so that said plurality of wet-laid fibers are reinforced at said plurality of said plurality of interstices by said plurality of particles and said binder, a plurality of said plurality of agglomerations being between said first surface and said second surface.

2. The friction material as recited in claim 1 wherein said plurality of wet-laid fibers comprise a majority of non-cellulose fibers.

3. The friction material as recited in claim 1 wherein said plurality of wet-laid fibers comprise a length of at least 0.08 mm.

4. The friction material as recited in claim 1 wherein said friction material is saturated with said binder that is thermoset or thermoplastic.

5. The friction material as recited in claim 1 wherein said binder comprises said plurality of particles.

6. The friction material as recited in claim 5 wherein said plurality of particles comprises a plurality of particle materials which comprises at least one of the following: a carbonaceous material; a nitride material; a metallic oxide material; a silicacious material; a powdered or granulated elastomeric material; a carbide material; a polymeric material; or a mineral.

7. The friction material as recited in claim 5 wherein said plurality of particles comprise a metallurgical coke.

8. The friction material as recited in claim 5 wherein said plurality of particles comprise a petroleum coke.

9. The friction material as recited in claim 5 wherein said plurality of particles comprise an activated carbon.

10. The friction material as recited in claim 5 wherein said plurality of particles comprise a graphite carbon.

11. The friction material as recited in claim 5 wherein said plurality of particles within said binder comprise a minor dimension as small as about 150 nm and a major dimension as large as about to 300 microns.

12. The friction material as recited in claim 5 wherein said plurality of particles are finely chopped or milled fibers comprising a length less than 400 microns.

13. The friction material as recited in claim 5 wherein the friction material comprises a minimum shear strength of at least 1.3 MPa.

14. The friction material as recited in claim 5 wherein said friction material is adapted to be adhered to a part for use in a vehicle, wherein said part is a torque converter, a clutch plate, a synchronizer ring, or other torque transmission device.

15. The friction material as recited in claim 5 wherein when the wet-laid friction material comprises an outer diameter of greater than or equal to 282.5 mm and an inner diameter of less than or equal to 254 mm and said wet-laid friction material is bonded to a carrier having a thickness of at least 0.6 mm when tested under a pressure of a least 400 kPa in a fluid with kinematic viscosity of about 9.32 cSt, without the addition of grooves or texture, the flow rate across the wet-laid friction material ranges between about 0.4 l/min and 4.0 l/min.

16. The friction material as recited in claim 5 wherein said plurality of particles comprises a plurality of particle materials which comprises at least one of the following: a carbonaceous material; a nitride material; a metallic oxide material; a silicacious material; a powdered or granulated elastomeric material; a carbide material; a polymeric material; or a mineral.

17. The friction material as recited in claim 1 wherein said skeletal matrix comprises a plurality of agglomerations of different sizes at said plurality of interstices, respectively.

18. The friction material as recited in claim 17 wherein said plurality of particles comprise a plurality of particle materials which comprises at least one of the following: a carbonaceous material; a nitride material; a metallic oxide material; a silicacious material; a powdered or granulated elastomeric material; a carbide material; a polymeric material; or a mineral.

19. The friction material as recited in claim 1 wherein said skeletal matrix comprises a plurality of agglomerations of different sizes at said plurality of interstices with said binder.

20. The friction material as recited in claim 19 wherein said plurality of particles comprise a metallurgical coke.

21. The friction material as recited in claim 19 wherein said plurality of particles comprise a petroleum coke.

22. The friction material as recited in claim 19 wherein said plurality of particles comprise an activated carbon.

23. The friction material as recited in claim 19 wherein said plurality of particles comprise a graphite carbon.

24. The friction material as recited in claim 1 wherein said skeletal matrix comprises a plurality of agglomerations at said plurality of interstices, respectively, said plurality of agglomerations being defined by said binder with said plurality of particles provided in said binder.

25. The friction material as recited in claim 24 wherein said plurality of particles comprise a minor dimension as small as about 150 nm and a major dimension as large as about to 300 microns.

26. The friction material as recited in claim 24 wherein said plurality of particles comprise a metallurgical coke.

27. The friction material as recited in claim 24 wherein said plurality of particles comprise a petroleum coke.

28. The friction material as recited in claim 24 wherein said plurality of particles comprise an activated carbon.

29. The friction material as recited in claim 24 wherein said plurality of particles comprise a graphite carbon.

30. The friction material as recited in claim 24 wherein said plurality of particles are finely chopped or milled fibers comprising a length less than 400 microns.

31. The friction material as recited in claim 24 wherein when the wet-laid friction material comprises an outer diameter of greater than or equal to 282.5 mm and an inner diameter of less than or equal to 254 mm and said wet-laid friction material is bonded to a carrier having a thickness of at least 0.6 mm when tested under a pressure of a least 400 kPa in a fluid with kinematic viscosity of about 9.32 cSt, without the addition of grooves or texture, the flow rate across the wet-laid friction material ranges between about 0.4 l/min and 4.0 l/min.

* * * * *

UNITED STATES PATENT AND TRADEMARK OFFICE
CERTIFICATE OF CORRECTION

PATENT NO.       : 7,488,401 B2
APPLICATION NO.  : 11/178728
DATED            : February 10, 2009
INVENTOR(S)      : James Martin Lee, Eric Arthur Schueler and Matthew Joseph Trippel It is certified that error appears in the above-identified patent and that said Letters Patent is hereby corrected as shown below:

In Column 2, Line 18, after the word "material", please insert --having a first surface and a second surface--.

In Column 2, Line 21, after the word "porosity", please delete "wherein the predetermined porosity is on the order of about 5 cubic feet per minute to 80 cubic feet per minute of air per square foot of material at a pressure drop of 0.5 inches of water." and insert --the plurality of wet-laid fibers cooperating to define a plurality of interstices in the skeletal matrix, wherein a majority of the plurality of wet-laid fibers comprise a length of at least 0.08mm, a binder, a plurality of particles, and a plurality of agglomerations comprising the binder and the plurality of particles, the plurality of agglomerations being formed or provided at the plurality of the plurality of interstices, respectively, so that the plurality of wet-laid fibers are reinforced at the plurality of the plurality of interstices by the plurality of particles and the binder, a plurality of the plurality of agglomerations being between the first surface and the second surface-- therefor.

In Column 3, Line 12, after the word "clutch", please insert --plate--.

In Column 3, Line 12, after "(FIG. 1)", please delete "clutch plate" and insert --ring-- therefor.

In Column 3, Line 15, after the word "clutch", please insert --plate--.

In Column 3, Line 17, after the word "a", please delete "clutch disc or plate" and insert --ring-- therefor.

In Column 4, Line 11, after the word "fibers", please delete "14" and insert --18-- therefor.

In Column 4, Line 11, please delete "particles" and insert --particulate material-- therefor.

In Column 4, Line 18, please delete "materials" and insert --fiber-- therefor.

In Column 4, Line 18, after "18", please delete ",".

UNITED STATES PATENT AND TRADEMARK OFFICE
CERTIFICATE OF CORRECTION

PATENT NO. : 7,488,401 B2
APPLICATION NO. : 11/178728
DATED : February 10, 2009
INVENTOR(S) : James Martin Lee, Eric Arthur Schueler and Matthew Joseph Trippel It is certified that error appears in the above-identified patent and that said Letters Patent is hereby corrected as shown below:

In Column 4, Line 18, after "18", please insert --and particulate material--.

In Column 4, Line 32, please delete "Drew-Flocc" and insert --DREWFLOC®-- therefor.

In Column 4, Lines 36-37, please delete "Drew-Flock" and insert --DREWFLOC®-- therefor.

In Column 5, Line 61, please delete "42" and insert --62-- therefor.

In Column 7, Line 40, please delete "product" and insert --supply-- therefor.

In Column 7, Line 51, please delete "Drew-Flocc" and insert --DREWFLOC®-- therefor.

In Column 7, Line 52, please delete "26".

In Column 7, Line 54, please delete "supply" and insert --tank-- therefor.

In Column 7, Line 63, please delete "rolls" and insert --rollers-- therefor.

In Column 7, Line 64, after the word "the", please delete "cans" and insert --rollers-- therefor.

In Column 8, Line 10, please delete "42" and insert --62-- therefor.

In Column 9, Line 17, please delete "20" and insert --22-- therefor.

In Column 10, Line 18, please delete "disc" and insert --plate-- therefor.

In Column 10, Line 19, please delete "10" and insert --12-- therefor.

UNITED STATES PATENT AND TRADEMARK OFFICE
CERTIFICATE OF CORRECTION

PATENT NO. : 7,488,401 B2
APPLICATION NO. : 11/178728
DATED : February 10, 2009
INVENTOR(S) : James Martin Lee, Eric Arthur Schueler and Matthew Joseph Trippel It is certified that error appears in the above-identified patent and that said Letters Patent is hereby corrected as shown below:

In Column 10, Line 23, after the word "clutch", please insert --plate--.

Signed and Sealed this

Twenty-third Day of June, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,488,401 B2 |
| APPLICATION NO. | : 11/178728 |
| DATED | : February 10, 2009 |
| INVENTOR(S) | : James Martin Lee et al. |

Page 1 of 1

It is certified that error appears in the above-identified patent and that said Letters Patent is hereby corrected as shown below:

This certificate supersedes the Certificate of Correction issued June 23, 2009. The certificate should be vacated since corrections included in the Certificate of Correction was disapproved by the primary examiner in the response to rule 312 communication dated January 8, 2009.

Signed and Sealed this

Fourth Day of August, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,488,401 B2
APPLICATION NO.   : 11/178728
DATED             : February 10, 2009
INVENTOR(S)       : James Martin Lee, Eric Arthur Schueler and Matthew Joseph Trippel It is certified that error appears in the above-identified patent and that said Letters Patent is hereby corrected as shown below:

In Column 2, Line 18, after the word "material", please insert --having a first surface and a second surface--.

In Column 2, Line 21, after the word "porosity", please delete "wherein the predetermined porosity is on the order of about 5 cubic feet per minute to 80 cubic feet per minute of air per square foot of material at a pressure drop of 0.5 inches of water." and insert --the plurality of wet-laid fibers cooperating to define a plurality of interstices in the skeletal matrix, wherein a majority of the plurality of wet-laid fibers comprise a length of at least 0.08mm, a binder, a plurality of particles, and a plurality of agglomerations comprising the binder and the plurality of particles, the plurality of agglomerations being formed or provided at the plurality of the plurality of interstices, respectively, so that the plurality of wet-laid fibers are reinforced at the plurality of the plurality of interstices by the plurality of particles and the binder, a plurality of the plurality of agglomerations being between the first surface and the second surface-- therefor.

In Column 3, Line 12, after the word "clutch", please insert --plate--.

In Column 3, Line 12, after "(FIG. 1)", please delete "clutch plate" and insert --ring-- therefor.

In Column 3, Line 15, after the word "clutch", please insert --plate--.

In Column 3, Line 17, after the word "a", please delete "clutch disc or plate" and insert --ring-- therefor.

In Column 4, Line 11, after the word "fibers", please delete "14" and insert --18-- therefor.

In Column 4, Line 11, please delete "particles" and insert --particulate material-- therefor.

In Column 4, Line 18, please delete "materials" and insert --fiber-- therefor.

In Column 4, Line 18, after "18", please delete ",".

In Column 4, Line 18, after "18", please insert --and particulate material--.

In Column 4, Line 32, please delete "Drew-Flocc" and insert --DREWFLOC®-- therefor.

CERTIFICATE OF CORRECTION (continued)
U.S. Pat. No. 7,488,401 B2

In Column 4, Lines 36-37, please delete "Drew-Flock" and insert --DREWFLOC®-- therefor.

In Column 5, Line 61, please delete "42" and insert --62-- therefor.

In Column 7, Line 40, please delete "product" and insert --supply-- therefor.

In Column 7, Line 51, please delete "Drew-Flocc" and insert --DREWFLOC®-- therefor.

In Column 7, Line 52, please delete "26".

In Column 7, Line 54, please delete "supply" and insert --tank-- therefor.

In Column 7, Line 63, please delete "rolls" and insert --rollers-- therefor.

In Column 7, Line 64, after the word "the", please delete "cans" and insert --rollers-- therefor.

In Column 8, Line 10, please delete "42" and insert --62-- therefor.

In Column 9, Line 17, please delete "20" and insert --22-- therefor.

In Column 10, Line 18, please delete "disc" and insert --plate-- therefor.

In Column 10, Line 19, please delete "10" and insert --12-- therefor.

In Column 10, Line 23, after the word "clutch", please insert --plate--.

Signed and Sealed this

Nineteenth Day of January, 2010

David J. Kappos
*Director of the United States Patent and Trademark Office*